(12) United States Patent
Rubin et al.

(10) Patent No.: US 12,135,433 B2
(45) Date of Patent: Nov. 5, 2024

(54) ARBITRARY POLARIZATION-SWITCHABLE METASURFACES

(71) Applicant: PRESIDENT AND FELLOWS OF HARVARD COLLEGE, Cambridge, MA (US)

(72) Inventors: Noah A. Rubin, Cambridge, MA (US); Jan Philipp Balthasar Mueller, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 51 days.

(21) Appl. No.: 18/120,958

(22) Filed: Mar. 13, 2023

(65) Prior Publication Data

US 2023/0288716 A1     Sep. 14, 2023

Related U.S. Application Data

(63) Continuation of application No. 16/327,771, filed as application No. PCT/US2017/048469 on Aug. 24, 2017, now Pat. No. 11,604,364.

(Continued)

(51) Int. Cl.
*G02B 27/28*     (2006.01)
*G02B 1/00*      (2006.01)
(Continued)

(52) U.S. Cl.
CPC .......... *G02B 27/286* (2013.01); *G02B 1/002* (2013.01); *G02B 5/3083* (2013.01);
(Continued)

(58) Field of Classification Search
CPC .. G02B 27/286; G02B 27/283; G02B 27/285; G02B 1/002; G02B 5/3083;
(Continued)

(56) References Cited

U.S. PATENT DOCUMENTS 4,777,116 A    10/1988  Kawatsuki et al.
8,169,703 B1    5/2012  Mossberg et al.
(Continued)

OTHER PUBLICATIONS

Arbabi et al., "Miniature optical planar camera based on a wide-angle metasurface doublet corrected for monochromatic aberrations", Nature Communications, Nov. 28, 2016, 7 (13682) (Year: 2016).*
Anonymous, "Elliptical polarization", Wikipedia, Jan. 11, 2022 (4 pages).
Arbabi, Amir et al., "Dielectric Metasurfaces for Complete Control of Phase and Polarization with Subwavelength Spatial Resolution and High Transmission", Nature nanotechnology 10, 11 (2015): 937-943, (Apr. 9, 2015).
(Continued)

*Primary Examiner* — Stephone B Allen
*Assistant Examiner* — Adam W Booher
(74) *Attorney, Agent, or Firm* — FOLEY & LARDNER LLP

(57) ABSTRACT

An optical component comprises a metasurface comprising nanoscale elements. The metasurface is configured to receive incident light and to generate optical outputs. The geometries and/or orientations of the nanoscale elements provide a first optical output upon receiving a polarized incident light with a first polarization, and provide a second optical output upon receiving a polarized incident light with a second polarization that is different from the first polarization.

18 Claims, 6 Drawing Sheets

Related U.S. Application Data

(60) Provisional application No. 62/379,186, filed on Aug. 24, 2016.

(51) Int. Cl.
  *G02B 5/30* (2006.01)
  *G03H 1/02* (2006.01)

(52) U.S. Cl.
  CPC ......... *G02B 27/283* (2013.01); *G03H 1/0244* (2013.01); *G02B 2207/101* (2013.01); *G03H 2222/31* (2013.01)

(58) Field of Classification Search
  CPC ...... G02B 5/3008; G02B 5/3016; G02B 5/30; G02B 5/02; G02B 5/3025; G02B 5/0221; G02B 2207/101; G03H 1/0244; G03H 1/024; G03H 2222/31
  See application file for complete search history.

(56) References Cited

U.S. PATENT DOCUMENTS

| | | |
|---|---|---|
| 9,310,535 B1 | 4/2016 | Greiner et al. |
| 9,995,930 B2 | 6/2018 | Arbabi et al. |
| 10,310,148 B2 | 6/2019 | Stewart et al. |
| 10,539,723 B2 | 1/2020 | Iazikov et al. |
| 2002/0181126 A1 | 12/2002 | Nishioka |
| 2016/0077261 A1 | 3/2016 | Arbabi et al. |
| 2018/0045953 A1 | 2/2018 | Fan et al. |
| 2019/0162592 A1 | 5/2019 | Khorasaninejad et al. |
| 2020/0355913 A1 | 11/2020 | Park et al. |
| 2021/0149081 A1 | 5/2021 | Groever et al. |

OTHER PUBLICATIONS

Extended European Search Report for EP Appl. No. 17858861.2, issued May 30, 2022, 5 pages.
Final Office Action for U.S. Appl. No. 16/327,771, issued on May 10, 2022, 16 pages.
International Search Report and Written Report for International Patent Application No. PCT/US2017/048469, issued on May 4, 2018, 8 pages.
Khorasaninejad, Mohammadreza et al., "Broadband and chiral binary dielectric meta-holograms", Science Advances, vol. 2, No. 5, May 13, 2016, 6 pages.
Liu, Yachao et al., "Realization of polarization evolution on higher-order Poincare sphere with metasurface", Applied Physics Letters 104, 19 (2014): 191110 (Aug. 7, 2014), p. 1-2.
Mirsalehi, "Optical Information Processing" Encyclopedia of Physical Science and Technology, Oct. 22, 2001, 3rd Edition, 1-18:335-340.
Non-Final Office Action for U.S. Appl. No. 16/327,771, issued Nov. 16, 2021, 14 pages.
Notice of Allowance for U.S. Appl. No. 16/327,771, issued on Nov. 2, 2022, 11 pages.
Peinado, Alba et al., "Optimization and performance criteria of a Stokes polarimeter based on two variable retarders", Optics Express, vol. 18, No. 10, May 10, 2010, 16 pages.
Search Report for corresponding EP Patent Application No. 17858861.2, issued on Mar. 23, 2020, 9 pages.
Examination Report for corresponding European Patent Application No. 17858861.2, issued Mar. 13, 2024, 5 pages.

* cited by examiner

ARBITRARY POLARIZATION-SWITCHABLE METASURFACES

CROSS-REFERENCE TO RELATED APPLICATIONS

This application is a continuation application of U.S. patent application Ser. No. 16/327,771, filed Feb. 22, 2019, which is a National Stage Entry of International Application No. PCT/US2017/048469, filed Aug. 24, 2017, which claims the benefit of and priority to U.S. Provisional Patent Application 62/379,186, filed Aug. 24, 2016, which is incorporated herein by reference in its entirety.

STATEMENT OF FEDERALLY SPONSORED RESEARCH OR DEVELOPMENT

This invention was made with Government support under FA9550-14-1-0389 and FA9550-16-1-0156, awarded by the Air Force Office of Scientific Research. The Government has certain rights in the invention.

BACKGROUND

In human experience, light is characterized by its brightness and color. Light is electromagnetic radiation within a range of wavelengths visible to humans, where wavelength is interpreted by humans in terms of color. Electromagnetic radiation is a wave-like disturbance that propagates through space. A property of electromagnetic radiation related to propagation is polarization, which is imperceptible to the human eye. Polarization refers to a path along which an electric field of the electromagnetic radiation oscillates. Linear polarization refers to the electric field oscillating in a two-dimensional plane around a line as the electromagnetic radiation propagates along the line. Elliptical polarization (including the more specific case of circular polarization) refers to the electromagnetic radiation spiraling in an elliptical pattern centered around a line along which the electromagnetic radiation propagates. The ability to generate, manipulate, and measure polarization is important in diverse areas of science and technology.

SUMMARY

Optical metasurfaces may be used to form flat optics, meaning very thin (e.g., nanoscale, with one or more dimensions less than one micrometer (µm)) optics, which can replace conventional optics (e.g., several orders of magnitude thicker than nanoscale), can replace combinations of conventional optics, and can provide functionalities that are not achievable by conventional optics. For example, a metasurface can apply a spatially-dependent phase shift (e.g., a time delay) to incident light, such that the metasurface can be used to manipulate an optical wavefront with high flexibility.

Described in the present disclosure are metasurfaces that can be designed such that a single metasurface can provide multiple functionalities responsive to a polarity of light incident on the metasurface. For example, nanoscale components can be designed to respond differently to orthogonal linear polarizations, allowing for polarization selectivity. Notably, this allows for design of metasurfaces behaving as wholly separate optical elements for each of any two orthogonal linear polarizations. For example, this allows for the design of a metasurface that, when illuminated with x-polarized light provides a function of a lens and, when illuminated with y-polarized light, provides a function of projection of a holographic image.

Further, according to embodiments of the present disclosure, metasurfaces may be designed to respond to a first elliptical polarization with a first functionality and respond to a second elliptical or linear polarization with a second functionality.

DETAILED DESCRIPTION

Figure 1A:
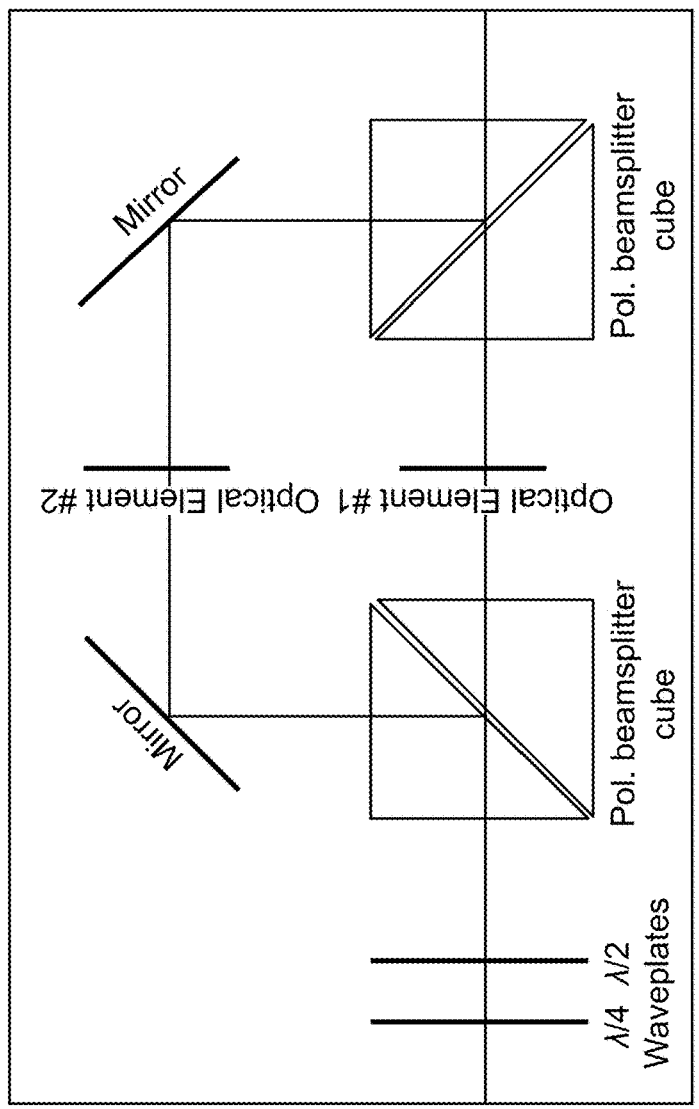
FIG. 1A illustrates an ultra-compact metasurface according to embodiments of the present disclosure.

FIG. 1A illustrates an ultra-compact metasurface that can impart one of two arbitrary and independent phase profiles on any set of orthogonal polarizations (linear or elliptical) depending on which polarization is incident. In other words, a single metasurface can function as two completely independent optical elements—such as lenses, prisms, and holograms—depending on a polarization state of the incident light.

Figure 1B:
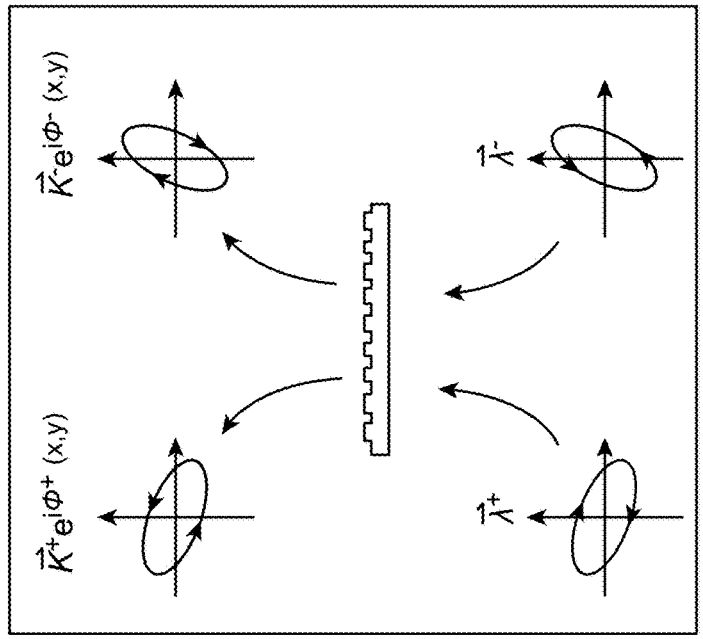
FIG. 1B illustrates conventional optics.

FIG. 1B illustrates by way of comparison a setup incorporating conventional optics to realize the same functionality as the metasurface illustrated in FIG. 1A. The complicated setup illustrated in FIG. 1B could cost in the thousands of dollars. For example, if it is desired to have light pass through one of two arbitrary optical elements depending on which of two orthogonal polarizations is incident, incident light would first have to pass through a cascade of a half-wave and a quarter-wave plate (e.g., at least $230 each), oriented so as to convert each of the two polarizations to x and y linearly polarized light. Then, a conventional polarization beam splitting cube (e.g., at least $215) would send light into one of two directions depending on incident polarization. Then, the two desired optical elements (e.g., lenses, gratings, holograms, etc.) would each be positioned to act on the light, and a second polarization beam splitting cube (e.g., at least $215) would be included to recombine the light. Altogether, such a setup would cost upwards of $1000, not including mounting hardware and the optical elements. Moreover, if a relative phase between the polarization channels is of importance, an implementation with conventional optical elements could prove challenging.

Referring again to FIG. 1A, a metasurface according to embodiments of the present disclosure can miniaturize a complicated optical functionality to a single, ultra-compact optical element fabricated by a single manufacturing stage using lithography. Additionally, manufacturing is scalable, such that multiple metasurfaces (e.g., including the metasurface illustrated in FIG. 1A) can be prepared concurrently at low cost; for example, using extreme ultraviolet (EUV) technology. Moreover, outputs of the two polarization channels of each metasurface will be in phase without any special consideration.

As can be seen by the above discussion, metasurfaces designed according to embodiments of the present disclosure can provide an optimal platform for ultra-compact polarization optics.

Figure 2:
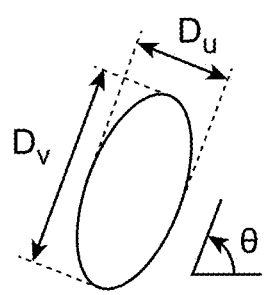
FIG. 2 illustrates an example of a shape-birefringent element according to embodiments of the present disclosure.

FIG. 2 illustrates an example of a shape-birefringent element depicted from a top view. Polarization-sensitive metasurfaces of the type discussed above are realized as subwavelength-spaced arrays of such shape-birefringent elements. Although shown as having an elliptical cross-section (e.g., dielectric pillars of elliptical cross-section with two independently tunable dimensions and an arbitrary rotation angle), more generally each shape-birefringent element has two perpendicular symmetry axes and imparts unique phase shifts on linear polarizations polarized along each axis. In other words, each element behaves as a linearly birefringent waveplate, and as such can be described by a Jones matrix of the form shown in Equation (1).

$$J = R(|-\theta|)\begin{bmatrix} e^{i\phi_x} & 0 \\ 0 & e^{i\phi_y} \end{bmatrix} R(\theta) \tag{1}$$

The shape-birefringent element imposes phase shifts $\phi_x$ and $\phi_y$ on light linearly polarized along its fast and slow axes, which are rotated by an angle $\theta$ relative to a reference coordinate system. R is a 2×2 rotation matrix. The waveplate-like behavior can be realized with, for example, plasmonic antennas, liquid crystals, or dielectric pillars exhibiting mode birefringence (fabricated from, e.g., silicon (Si), gallium arsenide (GaAs), or titanium dioxide ($TiO_2$)). The cross section of the pillars may be, e.g., elliptical or rectangular.

Let the orthogonal polarization states upon which the metasurface should impart independent phase profiles be given by orthogonal Jones vectors $$\vec{\lambda}^+ = \begin{pmatrix} \lambda_1^+ \\ \lambda_2^+ \end{pmatrix}$$

and $$\vec{\lambda}^- = \begin{pmatrix} \lambda_1^- \\ \lambda_2^- \end{pmatrix}.$$

An output wavefront corresponding to each input polarization state $\{\vec{\lambda}^+, \vec{\lambda}^-\}$ should have homogenous polarization, so a condition is imposed that the metasurface should consistently transform the input polarization states to output polarization states $\{\vec{\kappa}^+, \vec{\kappa}^-\}$ as $\vec{\lambda}^+ \to \vec{\kappa}^+$ and $\vec{\lambda}^- \to \vec{\kappa}^-$ over an entire spatial extent of the metasurface.

Suppose it is of interest to design a metasurface imposing arbitrary spatial phase profiles $\phi^\pm(x,y)$ on the states $\vec{\lambda}^\pm$. That is, at each point (x,y) a condition is imposed that a metasurface element with Jones matrix J(x,y) satisfies Equation (2) and Equation (3) simultaneously.

$$J(x,y)\vec{\lambda}^+ = e^{i\phi^+(x,y)}\vec{\kappa}^+ \tag{2}$$

$$J(x,y)\vec{\lambda}^- = e^{i\phi^-(x,y)}\vec{\kappa}^- \tag{3}$$

Mathematically, the above system is solvable for any choice of $\{\vec{\kappa}^+, \vec{\kappa}^-\}$. However, imposing an additional condition of a single layer of metasurface elements with linear structural birefringence, J, constrains the design to the form of Equation (1). It can be shown that this condition directly implies that the output polarization states $\{\vec{\kappa}^+, \vec{\kappa}^-\}$ are the same states as the input states $\{\vec{\lambda}^+, \vec{\lambda}^-\}$, but with flipped handedness, described mathematically as $\vec{\kappa}^\pm = (\vec{\lambda}^\pm)^*$, where (*) denotes a complex conjugate.

Given this knowledge of $\{\vec{\kappa}^+, \vec{\kappa}^-\}$, the original system can be recast as shown in Equation (4).

$$J(x,y) = \begin{pmatrix} e^{i\phi^+(x,y)}(\lambda_1^+)^* & e^{i\phi^-(x,y)}(\lambda_1^-)^* \\ e^{i\phi^+(x,y)}(\lambda_2^+)^* & e^{i\phi^-(x,y)}(\lambda_2^-)^* \end{pmatrix}\begin{pmatrix} \lambda_1^+ & \lambda_1^- \\ \lambda_2^+ & \lambda_2^- \end{pmatrix}^{-1} \tag{4}$$

$$J(x,y) = K(x,y)\Lambda^{-1}$$

In Equation (4), $\Lambda$ is a 2×2 matrix whose columns are the input Jones vectors $\{\vec{\lambda}^+, \vec{\lambda}^-\}$, and K(x,y) is a 2×2 matrix whose columns are the phase-shifted output Jones vectors $e^{i\phi^\pm(x,y)}\vec{\kappa}^\pm = e^{i\phi^\pm(x,y)}(\vec{\lambda}^\pm)^*$ Imposing a condition of $\vec{\kappa}^\pm = (\vec{\lambda}^\pm)^*$ guarantees that the Jones matrix J(x,y) at each point (x,y) represents a linearly birefringent waveplate (in the sense of (Equation (1)), whose eigenvectors correspond to the fast and slow optical axes oriented at an angle $\theta$, and whose eigenvalues are $\{e^{i\phi_x}, e^{i\phi_y}\}$, where $\{\phi_x, \phi_y\}$ are the phase shifts imparted on light linearly polarized along the corresponding axes. An appropriate geometry implementing these phase shifts can then be located using, for example, finite-difference time-domain (FDTD) simulation. In this way, the geometry and the angular orientation of an element imposing the desired phases $\phi\pm$ on the set of target polarizations $\vec{\lambda}^\pm$ can be determined at each point, allowing for the design of a metasurface.

The formalism presented above is general and could well apply to any part of the electromagnetic spectrum, in reflection or transmission, so long as the individual phase-shifting elements implement a Jones matrix of the form of Equation (1).

Thus, a physical metaelement imparting phases $\phi\pm$ on arbitrary orthogonal polarization polarizations $\vec{\lambda}^\pm$ has a Jones matrix J defined by Equation (4). The orientation and dimensions of an element implementing this Jones matrix J are determined by the angle of the matrix's orthogonal linear eigen-polarizations and the characteristic phase shirts $\{\phi_x, \phi_y\}$ imposed. The result can be understood as a unification of the propagation and geometric phases in a single element. Desired phases can be imparted on any set of orthogonal polarization states by modifying an element's shape birefringence and angular orientation simultaneously.

Experimental Demonstration

To demonstrate the arbitrary phase control for polarizations other than linear polarizations, a metasurface encoding separate holograms for RCP (right-handed circular polarization) and LCP (left-handed circular polarization) light is fabricated and tested. The near-field phase profiles yielding far-field intensity images of a cartoon cat and a cartoon dog are computed using iterative phase retrieval. A metasurface including noninteracting, elliptical TiO$_2$ pillars is designed to impose these phase profiles independently on each circular polarization in transmission.

Figure 3A:
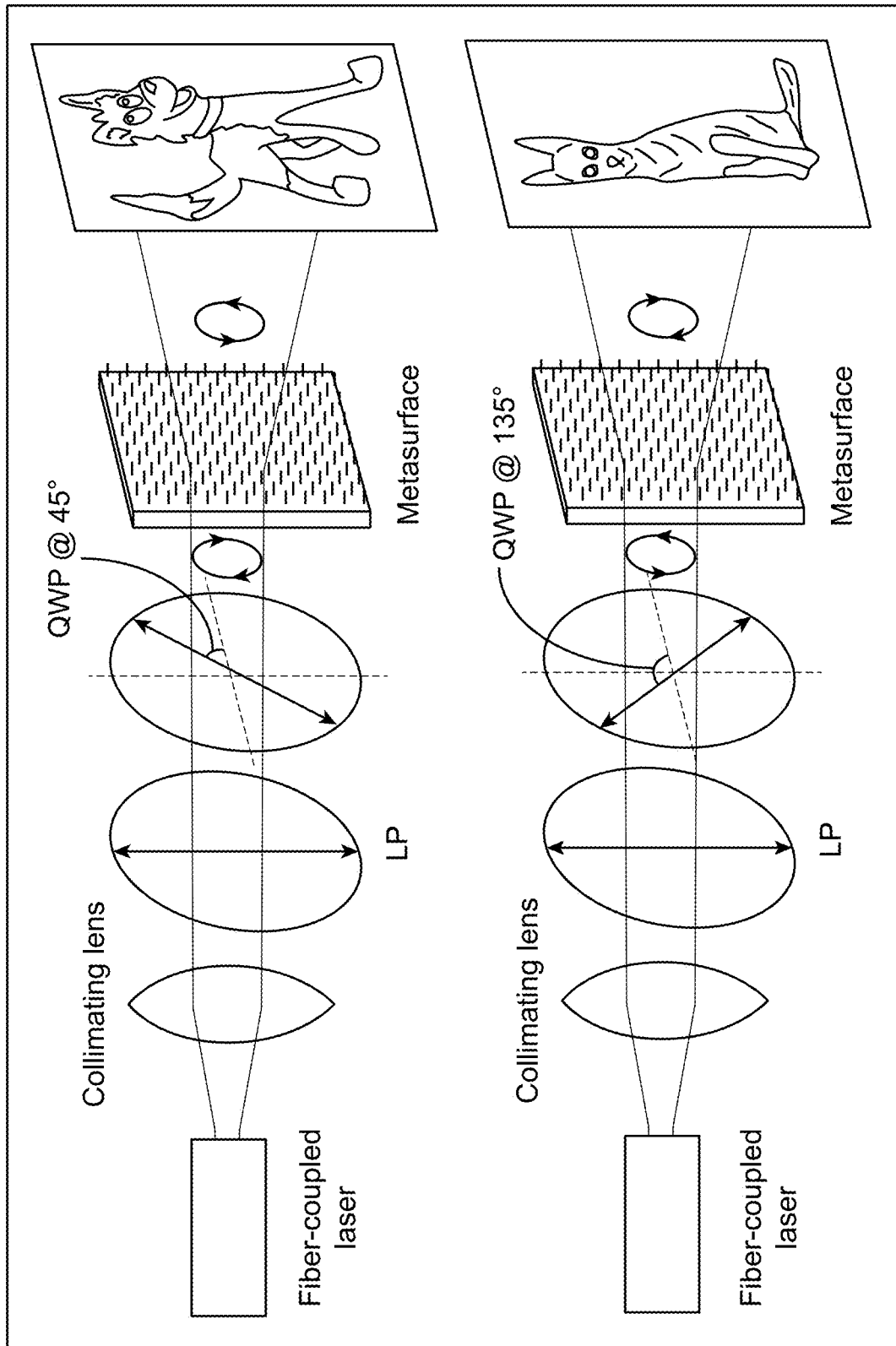
FIG. 3A illustrates a test that was performed on a metasurface according to an embodiment of the present disclosure.
Figure 3B:
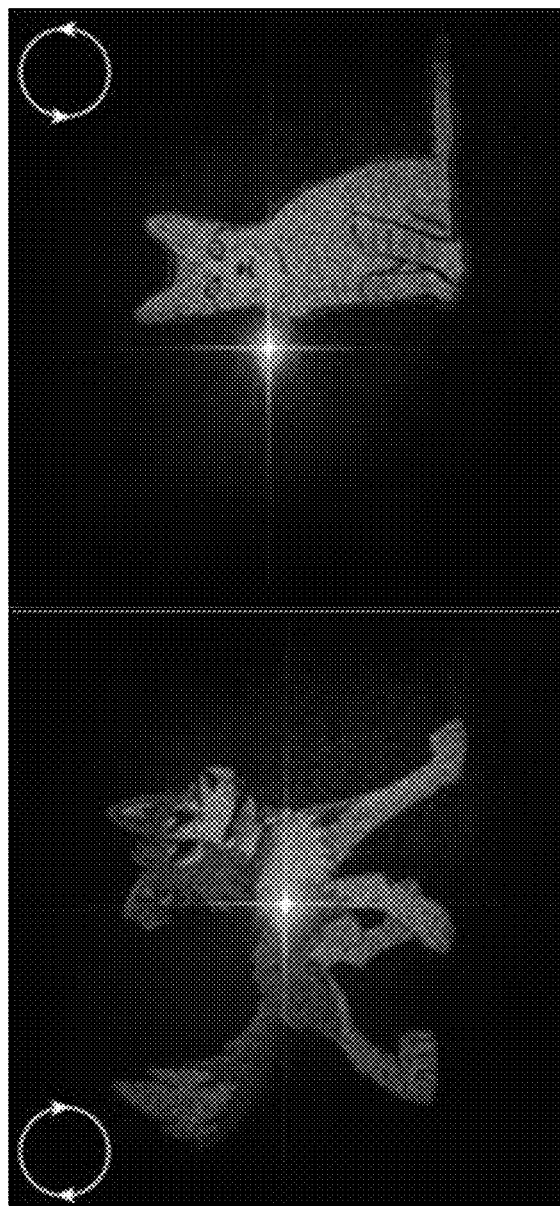
FIG. 3B presents resulting images from the test illustrated in FIG. 3A.
Figure 3D:
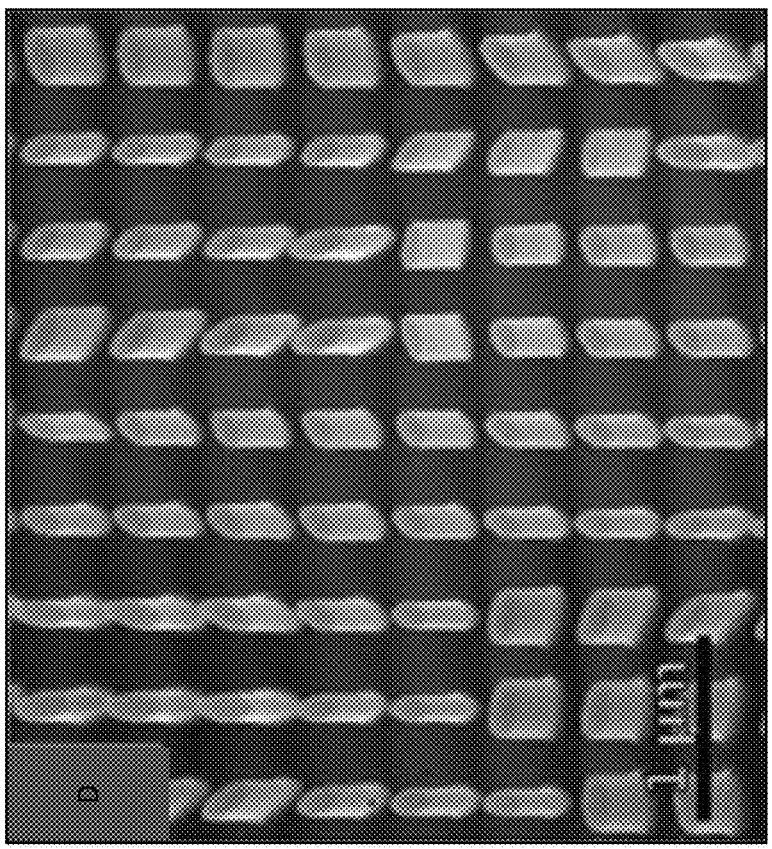
FIG. 3D is an enlarged oblique view of the image of FIG. 3C.
Figure 3C:
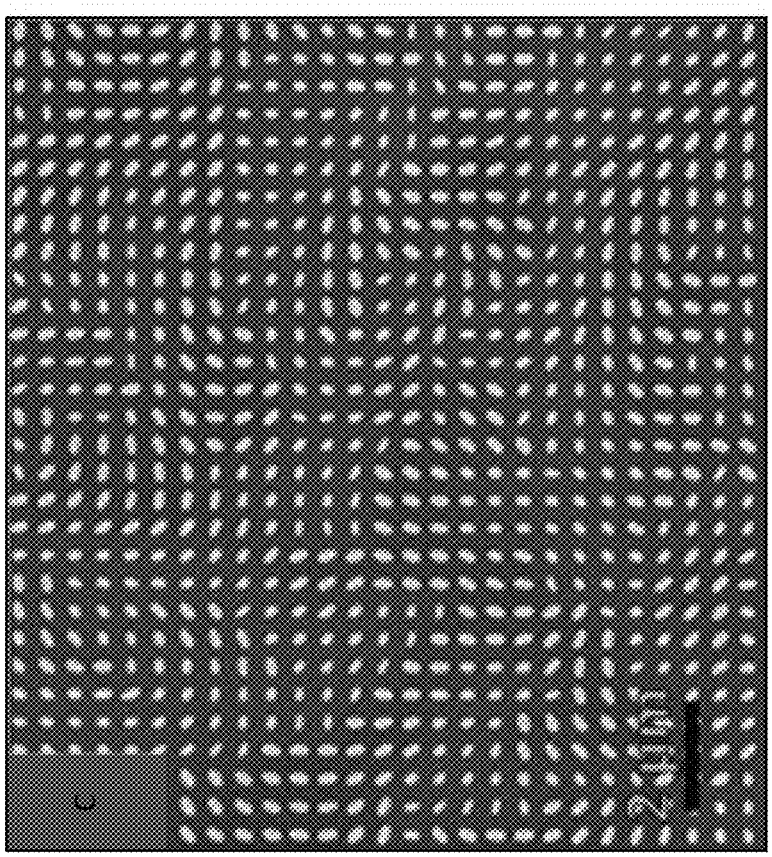
FIG. 3C is a scanning electron microscope (SEM) image of the metasurface tested in FIG. 3A.

In some embodiments, a broad range of pillars (with semi-major and minor axes ranging from 50-300 nm, assuming a height of 600 nm set by fabrication process) is simulated using full-wave FDTD simulations to find those that would satisfy the phase-shifting properties solved for in Eq. (4). The elements of the metasurfaces are birefringent waveguide-like pillars fabricated of titanium dioxide (TiO$_2$). Fabricated with a TiO$_2$ process on glass, the pillars are arranged in a square lattice with 500 nm nearest-neighbor separation as shown in FIGS. 3C and 3D. The metasurface is designed for and tested in the visible spectrum at λ=532 nm. The measured far-field intensity profiles upon illumination with each circular polarization match the design images with significant detail as shown in FIGS. 3A and 3B. It is to be understood that the phase profiles imparted on each circular polarization, and thus the projected far fields, are not fully independent due to a reliance on geometric phase alone. In these cases, only sections of the far field (such as individual diffraction orders) may contain independent images for each chirality. Using the disclosed method, the phase profiles imparted on each circular polarization (and, thus, the resulting far fields) can be decoupled.

Using the design strategy discussed above, one metasurface can act as two completely independent, arbitrarily specifiable optical elements depending on the polarization of incident light. To demonstrate this truly arbitrary phase control, metasurfaces encoding separate holograms for right circular polarization (a caricature of a dog) and left circular polarization (a caricature of a cat) were designed, fabricated and tested.

The near-field phase profiles yielding far-field intensity images of the cat and dog caricatures were computed using iterative phase retrieval. A metasurface of non-interacting, elliptical TiO$_2$ pillars was designed to impose these phase profiles independently on each circular polarization in transmission. A broad range of pillars (with semi-major and minor axes ranging from about 50 nanometers (nm) to about 300 nm) was simulated using full-wave FDTD simulations to find those that would satisfy the phase-shifting properties solved for in Equation (4). The pillars were of substantially uniform height (about 600 nm) and were arranged on a square lattice with about 500 nm nearest-neighbor separation. The metasurface was designed for and tested in the visible spectrum at λ=532 nm.

FIG. 3A illustrates conceptually a test that was performed on the metasurface encoding the dog and cat caricatures. Illustrated at the top of FIG. 3A is light that is right circularly polarized (at 45 degrees) and applied incident to the designed metasurface, where the light passes through the elements of the metasurface and is projected as the dog caricature according to the design. Illustrated at the bottom of FIG. 3A is light that is left circularly polarized (at 135 degrees) and applied incident to the same metasurface, where the light passes through the elements of the metasurface and is projected as the cat caricature according to the design.

FIG. 3B provides resulting images from the test illustrated in FIG. 3A. As can be seen, the measured far-field intensity profiles upon illumination with each circular polarization matched the design images with significant detail. The bright dot in the center of each image represents zero-order light not coupling into the metasurface due to fabrication imperfections and beam overfilling.

FIG. 3C is a scanning electron microscope (SEM) image of the designed (FIG. 3A) and tested (FIG. 3B) metasurface encoding the dog and cat caricatures. The metasurface is a rectangular array of TiO$_2$ pillars of elliptical cross-section and a nearest-neighbor separation of about 500 nm. The transverse dimensions of the pillars varied from about 50 nm to about 300 nm, and each was about 600 nm high.

FIG. 3D is an enlarged, oblique view of the SEM image of FIG. 3D.

Experimental Demonstration

The disclosed technology can be used for optical components such as elliptical polarization beam splitters. The beam splitter operates as a blazed grating defecting light in a direction dependent on the polarization. The elliptical polarization beam splitters can be used for polarimetry, where a thorough sampling of polarization state space, including elliptical states, is used to optimize sensitivity.

A metasurface deflecting light at an angle β imposes a linear phase profile given by $$\frac{2\pi x}{\lambda}\sin\beta,$$

with x being a spatial coordinate along a splitting direction. A metasurface polarization beam splitter imposes two such phase profiles with different β on each of two polarizations. Using the geometric and propagation phases in tandem as described above, this is possible for any set of two orthogonal, elliptical polarizations. To illustrate this capability, six beam-splitting metasurfaces were designed for six different sets of elliptical polarizations. The six metasurfaces were each designed to deflect orthogonal polarizations at ±7 degrees. It is to be understood that, although equal or opposite angles may be described in the present disclosure by way of convenient example, the techniques of the present disclosure are not constrained to equal or opposite angles.

Figure 4A:
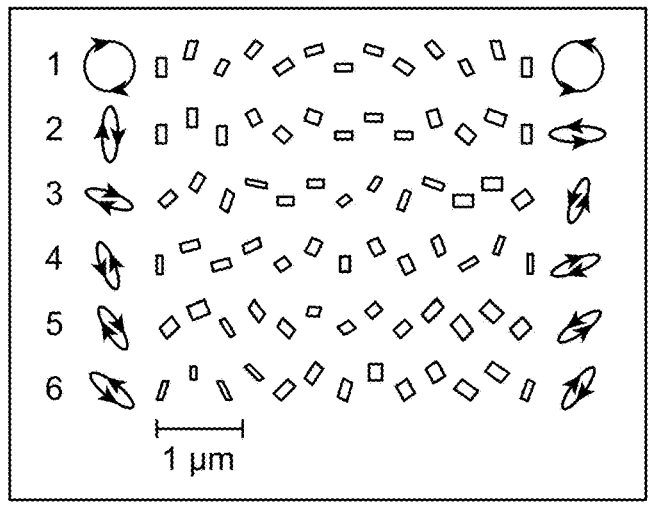
FIG. 4A illustrates six unit cells for six corresponding split-state metasurface designs.

FIG. 4A illustrates the design and relative positioning of elements in a unit cell for each of the six selected metasurface designs (where each of the metasurfaces included multiple of the corresponding unit cells). The design may be used for, e.g., elliptical polarization beam splitters. In FIG. 4A, the geometry of each beam-splitter unit cell is shown along with the polarization ellipses of the split states. The metasurfaces were realized with about 600 nm high rectangular TiO$_2$ pillars whose lateral dimensions ranged from about 50 nm to about 250 nm, on a hexagonal grid with about 420 nm nearest-neighbor separation. The unit cells shown (#1-6) were tessellated into six metasurfaces, each about 300 μm by about 300 μm. Note that unit cell design #1 replaces a conventional geometric phase grating for circular polarizations. Note also that unit cell designs #2-6 represent new functionality.

The testing of each metasurface beam splitter involved illumination with a set of six test polarization states. By measuring the m=±1 diffraction order intensity in response to each, the polarization states to which the device is most selective can be obtained; ideally, these would match the designed split states.

Figure 4B:
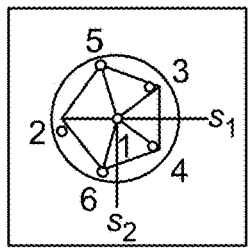
FIG. 4B provides a comparison between designed and measured properties of the six unit cells of FIG. 4A.
Figure 4B:
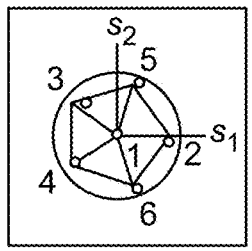
Figure 4C:
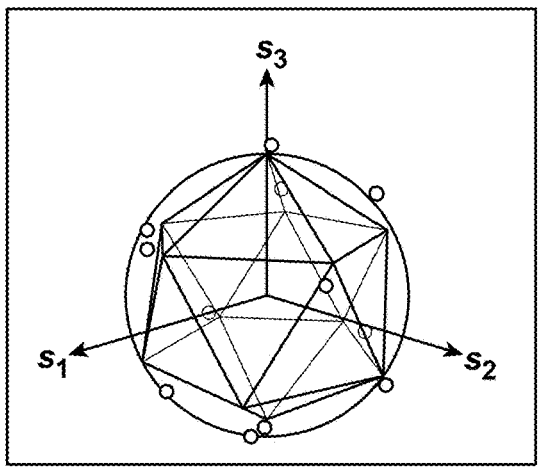
FIG. 4C provides a comparison between designed and measured properties of the six unit cells of FIG. 4A.
Figure 4D:
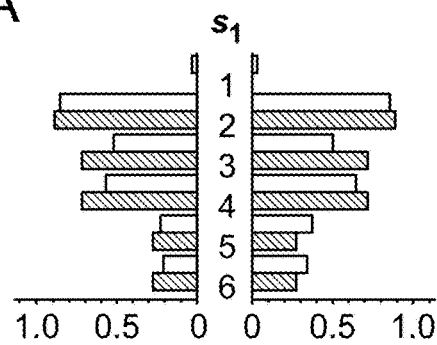
FIG. 4D provides a comparison between designed and measured properties of the six unit cells of FIG. 4A.
Figure 4D:
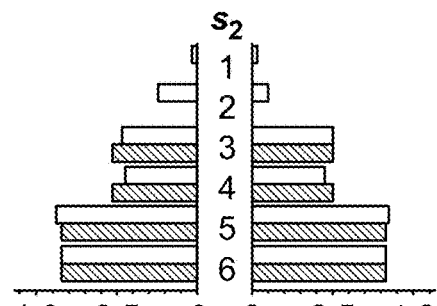
Figure 4D:
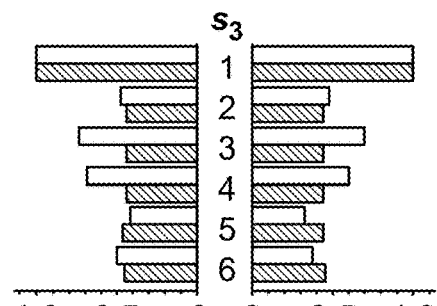

FIG. 4B-4D provide experimental results of the testing of the six metasurface designs of FIG. 4A, showing good agreement with the design. The elliptical polarizations chosen (the "split states") were the six sets of orthogonal Stokes vectors matching vertices of a regular icosahedron inscribed in a Poincare Sphere. The choice of an icosahedron in particular, and the platonic solids in general, corresponds to optimal sampling of states for polarimetry.

FIG. 4B shows the northern (right) and southern (left) hemispheres of the Poincare sphere, with designed and measured split states for metasurfaces #1-6 plotted, the designed split states of polarization (SOP) being vertices and the measured split SOPs being dots.

FIG. 4C shows in a three-dimensional depiction the information provided in FIG. 4B, where the design SOPs are vertices and the test results are dots.

FIG. 4D presents the information of FIGS. 4B and 4C in bar chart form for the Stokes coordinates ($s_1$, $s_2$, $s_3$).

Thus has been described a strategy for the design of an ultra-compact optical element that can effectively function as any two separate optical elements depending on which of any two orthogonal polarization states is incident. The approach was demonstrated in two experiments, namely circular polarization switchable holograms and elliptical polarization beam splitters, both at the technologically significant wavelength of λ=532 nm in the visible spectrum. In some embodiments, the approach can be extended to any frequency range.

Using the disclosed technology, a broad class of metasurfaces can impose arbitrary and independent phase profiles on any set of orthogonal polarization states, notably extending this capability to chiral polarizations without relying on chiral birefringence. In particular, the disclosed technology can be used to target elliptical polarization states, and provide an intuition for this phenomenon as arising from the combination of propagation and geometric phase. The formalism of the disclosed technology generalizes the design space offered by polarization-sensitive, linearly birefringent metasurfaces, enabling polarization switchable lenses for chiral polarizations (chiral lenses), more versatile q plates, and improved metasurface polarimeters for polarization state measurement.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to 0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to +0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:
1. An optical component, comprising:
a metasurface comprising nanoscale elements configured to receive incident light and to generate optical outputs,
wherein geometries or orientations of the nanoscale elements provide a first optical output upon receiving a polarized incident light with a first polarization, and provide a second optical output upon receiving a polarized incident light with a second polarization that is different from the first polarization,
wherein the first polarization is a linear polarization or a circular polarization,
wherein the Jones vector of the first polarization is defined by:

$$\vec{\lambda}^+ = \begin{bmatrix} \lambda_1^+ \\ \lambda_2^+ \end{bmatrix}$$

and the Jones vector of the second polarization is defined by:

$$\vec{\lambda}^- = \begin{bmatrix} \lambda_1^- \\ \lambda_2^- \end{bmatrix},$$

wherein the phase shift on the first polarization is defined by $\phi^+(x,y)$ and the phase shift on the second polarization is defined by $\phi^-(x,y)$, wherein the superscript * denotes the complex conjugate, and wherein the Jones matrix at each point (x,y) of the metasurface which defines the output when multiplied by the Jones vector of the polarized incident light is defined by:

$$J(x, y) = \begin{bmatrix} e^{i\phi^+(x,y)}(\lambda_1^+)^* & e^{i\phi^-(x,y)}(\lambda_1^-)^* \\ e^{i\phi^+(x,y)}(\lambda_2^+)^* & e^{i\phi^-(x,y)}(\lambda_2^-)^* \end{bmatrix} \begin{bmatrix} \lambda_1^+ & \lambda_1^- \\ \lambda_2^+ & \lambda_2^- \end{bmatrix}^{-1}.$$

2. The optical component of claim 1, wherein the first polarization and the second polarization are orthogonal to each other.

3. The optical component of claim 1, wherein the second polarization is an elliptical polarization.

4. The optical component of claim 1, wherein the nanoscale elements comprise linearly birefringent wave plate elements.

5. The optical component of claim 1, wherein the nanoscale elements comprise linearly birefringent wave plate elements comprising plasmonic antennas, liquid crystals, or dielectric pillars.

6. The optical component of claim 1, wherein orientation of the nanoscale elements at (x,y) is defined by the angle of the orthogonal linear eigenpolarizations of the Jones matrix $J(x,y)$.

7. The optical component of claim 1, wherein the second polarization is a linear polarization or a circular polarization.

8. An optical device, comprising:
a metasurface comprising nanoscale elements, geometries or orientations of the nanoscale elements encoding a plurality of hologram phase profiles corresponding to a plurality of polarizations;
wherein upon illuminated by an incident light with a first polarization of the plurality of polarizations, the metasurface projects a first image based on a first hologram phase profile of the plurality of hologram phase profiles, and wherein upon illuminated by an incident light with a second polarization of the plurality of polarizations, the metasurface projects a second image based on a second hologram phase profile of the plurality of hologram phase profiles,
wherein the first polarization is a linear polarization or a circular polarization,
wherein the Jones vector of the first polarization is defined by:

$$\vec{\lambda}^+ = \begin{bmatrix} \lambda_1^+ \\ \lambda_2^+ \end{bmatrix}$$

and the Jones vector of the second polarization is defined by:

$$\vec{\lambda}^- = \begin{bmatrix} \lambda_1^- \\ \lambda_2^- \end{bmatrix},$$

wherein the phase shift on the first polarization is defined by $\phi^+(x,y)$ and the phase shift on the second polarization is defined by $\phi^-(x,y)$, wherein the superscript * denotes the complex conjugate, and wherein the Jones matrix at each point (x,y) of the metasurface which defines the output when multiplied by the Jones vector of the polarized incident light is defined by:

$$J(x, y) = \begin{bmatrix} e^{i\phi^+(x,y)}(\lambda_1^+)^* & e^{i\phi^-(x,y)}(\lambda_1^-)^* \\ e^{i\phi^+(x,y)}(\lambda_2^+)^* & e^{i\phi^-(x,y)}(\lambda_2^-)^* \end{bmatrix} \begin{bmatrix} \lambda_1^+ & \lambda_1^- \\ \lambda_2^+ & \lambda_2^- \end{bmatrix}^{-1}.$$

9. The optical device of claim 8, wherein the metasurface is a chiral hologram projector.

10. The optical device of claim 8, further comprising:
a quarter-wave plate for adjusting a chirality of an incoming polarized light.

11. The optical device of claim 8, wherein the second polarization is an elliptical polarization.

12. The optical device of claim 8, wherein the first polarization and the second polarization are orthogonal to each other.

13. An optical device, comprising:
a metasurface comprising nanoscale elements, wherein geometries or orientations of the nanoscale elements are arranged such that the metasurface deflects incident light in different directions depending on polarization states of the incident light,
wherein the polarization states of the incident light comprise linear polarization or circular polarization states,
wherein the incident light comprises a first polarization of light and a second polarization of light,
wherein the Jones vector of the first polarization of light is defined by:

$$\vec{\lambda}^+ = \begin{bmatrix} \lambda_1^+ \\ \lambda_2^+ \end{bmatrix}$$

and the Jones vector of the second polarization of light is defined by:

$$\vec{\lambda}^- = \begin{bmatrix} \lambda_1^- \\ \lambda_2^- \end{bmatrix},$$

wherein the phase shift on the first polarization of light is defined by $\phi^+(x,y)$ and the phase shift on the second polarization of light is defined by $\phi^-(x,y)$, wherein the superscript * denotes the complex conjugate, and wherein the Jones matrix at each point (x,y) of the metasurface which defines the output when multiplied by the Jones vector of the polarized incident light is defined by:

$$J(x, y) = \begin{bmatrix} e^{i\phi^+(x,y)}(\lambda_1^+)^* & e^{i\phi^-(x,y)}(\lambda_1^-)^* \\ e^{i\phi^+(x,y)}(\lambda_2^+)^* & e^{i\phi^-(x,y)}(\lambda_2^-)^* \end{bmatrix} \begin{bmatrix} \lambda_1^+ & \lambda_1^- \\ \lambda_2^+ & \lambda_2^- \end{bmatrix}^{-1}.$$

14. The optical device of claim 13, wherein the second polarization of light is an elliptical polarization that corresponds to Stokes vectors matching vertices of an icosahedron.

15. The optical device of claim 14, wherein the vertices of an icosahedron are inscribed in a Poincare sphere.

16. The optical device of claim 13, wherein the metasurface is a polarization beam splitter.

17. The optical device of claim 13, wherein the optical device is a polarimeter.

18. The optical device of claim 13, wherein the polarization states of the incident light are orthogonal to each other.

* * * * *